United States Patent
Kim et al.

(10) Patent No.: US 8,683,594 B2
(45) Date of Patent: Mar. 25, 2014

(54) DATA STORAGE DEVICES INCLUDING INTEGRATED ANTI-VIRUS CIRCUITS AND METHOD OF OPERATING THE SAME

(75) Inventors: Byung-Gook Kim, Hwaseong-si (KR); Chanik Park, Hwaseong-si (KR); Jisoo Kim, Yongin-si (KR); Dawoon Jung, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/425,373

(22) Filed: Mar. 20, 2012

(65) Prior Publication Data
US 2012/0246729 A1    Sep. 27, 2012

(30) Foreign Application Priority Data
Mar. 24, 2011   (KR) .......................... 10-2011-0026568

(51) Int. Cl.
| G06F 11/00 | (2006.01) |
|---|---|
| G06F 12/14 | (2006.01) |
| G06F 12/16 | (2006.01) |
| G08B 23/00 | (2006.01) |
| G06F 9/00 | (2006.01) |
| G06F 15/16 | (2006.01) |
| G06F 17/00 | (2006.01) |
| G06F 11/30 | (2006.01) |

(52) U.S. Cl.
USPC ................................ 726/24; 726/11; 713/187

(58) Field of Classification Search
USPC .............................................. 713/187; 726/11
See application file for complete search history.

(56) References Cited

U.S. PATENT DOCUMENTS

| 7,260,725 B2 * | 8/2007 | Carmona et al. .............. 713/187 |
|---|---|---|
| 7,657,941 B1 * | 2/2010 | Zaitsev ............................ 726/24 |
| RE44,131 E * | 4/2013 | Togawa et al. .................. 726/24 |
| 2007/0261112 A1 * | 11/2007 | Todd et al. ...................... 726/11 |
| 2008/0184372 A1 * | 7/2008 | Hoshina .......................... 726/24 |
| 2010/0154062 A1 * | 6/2010 | Baram et al. .................... 726/24 |

FOREIGN PATENT DOCUMENTS

| JP | 2006-048719 | 2/2006 |
|---|---|---|
| JP | 2007-122109 | 5/2007 |
| JP | 2009-015864 | 1/2009 |

* cited by examiner

*Primary Examiner* — Shin-Hon Chen
(74) *Attorney, Agent, or Firm* — Myers Bigel Sibley & Sajovec, P.A.

(57) ABSTRACT

A data storage device includes a storage medium and a controller circuit configured to be coupled to an external host to provide an interface between the external host and the storage medium, the controller circuit configured to detect a virus carried by a data file transferred to and/or stored in the storage medium. The controller circuit may be further configured to cure the detected virus.

18 Claims, 8 Drawing Sheets

DATA STORAGE DEVICES INCLUDING INTEGRATED ANTI-VIRUS CIRCUITS AND METHOD OF OPERATING THE SAME

CROSS-REFERENCE TO RELATED APPLICATIONS

This application claims the benefit, under 35 U.S.C §119, of Korean Patent Application No. 10-2011-0026568 filed Mar. 24, 2011, the entirety of which is incorporated by reference herein.

BACKGROUND

Exemplary embodiments relate to data storage apparatus and methods and, more particularly, to anti-virus detection and cure for data stored in such devices.

Computer viruses may infect data processed or stored in a computer device. A computer virus may infect any of a variety of different types of files including, for example, binary executable files, volume boot records (VBRs) and master boot records (MBRs).

An anti-virus agent (e.g., a program) may detect and cure a computer virus on data stored in a working memory device and a data storage device to protect data from malicious code. The anti-virus agent may detect a path or data that is infected or is capable of being infected by the computer virus, in run time. The anti-virus agent may be implemented by independent software that is included in an operating system or driven by the operating system. Computer virus detection and cure on data stored in a data storage device may take a significant amount of time due to many data input/output steps.

SUMMARY

Some embodiments of the inventive subject matter provide a data storage device including a storage medium and a controller circuit configured to be coupled to an external host to provide an interface between the external host and the storage medium. The controller circuit is configured to detect a virus carried by a data file transferred to and/or stored in the storage medium. The controller circuit may be further configured to cure the detected virus.

In some embodiments, the controller circuit may be configured to detect a virus in a data file received from the external host in conjunction with a write command from the external host. The controller circuit may be further configured to store a virus detection result for the received data file in metadata stored for the file. The controller circuit may also be configured to indicate presence of the detected virus to the external host.

In further embodiments, the controller circuit may be configured to detect presence of a virus in a data file stored in the storage medium responsive to a read command received from the external host. The controller circuit may be configured to detect a virus in the data file responsive to receiving the data file from the external host, to include a virus detection result for the data file in metadata stored for the data file, and, responsive to the read command, to detect presence of the virus in the data file from the virus detection result in the stored metadata. The controller circuit may be further configured to selectively transfer the data file, an alternative file and/or an error message to the external host responsive to detecting presence of the virus.

In additional embodiments, the controller circuit may be configured to receive a virus scan command from the external host, to conduct a virus scan of a data file stored in the storage medium responsive to the virus scan command and to provide a virus scan result to the external host responsive to the virus scan. The controller circuit may be further configured to receive a virus cure command from the external host, to conduct a virus curing operation responsive to the received virus cure command and to provide a virus cure result to the external host responsive to the virus curing operation.

In some embodiments, the controller circuit may include an anti-virus circuit. The anti-virus circuit may include a matching circuit configured to detect a virus by comparing the data file and virus signature data and a curing circuit configured to delete the detected virus. The anti-virus circuit may further include a filter circuit configured to determine a virus infection probability of the data file.

In further embodiments, the storage medium may include first and second storage media connected to the controller via respective first and second channels. The data storage device may further include a first buffer memory device configured to buffer a data file transferred via the first channel and a second buffer memory device configured to buffer a data file transferred via the second channel. The anti-virus circuit may include a first anti-virus circuit configured to detect and cure a virus of the data file buffered by the first buffer memory device and a second anti-virus circuit configured to detect and cure a virus of the data file buffered by the second buffer memory device.

Additional embodiments of the inventive subject matter provide methods of operating a data storage device configured to be coupled to an external host. The methods include detecting a virus carried by a data file transferred to the storage device from the external host and/or stored in a storage medium of the data storage device using a controller circuit integrated with the storage medium in the storage device. Detecting a virus may not require virus scanning of the data file by the external host. The methods may further include curing the detected virus using the controller circuit.

In some embodiments, detecting a virus may include detecting the virus in a file received from the external host in conjunction with a write command from the external host. The methods may include storing a virus detection result for the received file in metadata stored for the file.

In some embodiments, detecting a virus may include detecting presence of a virus in a data file stored in the storage medium responsive to a read command received from the external host. In some embodiments, the methods further include detecting the virus in the data file responsive to receiving the data file from the external host and including a virus detection result for the data file in metadata stored for the data file. Detecting a virus may include detecting, responsive to the read command, presence of the virus in the data file from the virus detection result in the stored metadata.

In some embodiments, detecting a virus may be preceded by receiving a virus scan command from the external host and wherein detecting a virus includes conducting a virus scan of a data file stored in the storage medium responsive to the virus scan command and wherein the method further includes providing a virus scan result to the external host responsive to the virus scan.

One aspect of embodiments of the inventive subject matter is directed to provide a data storage device which includes a storage medium; and a controller configured to control the storage medium, wherein the controller includes an anti-virus circuit configured to detect a virus of one of a data file to be stored in the storage medium and a data file stored in the storage medium and to cure the detected virus, and wherein the controller is configured to drive a file system for managing the data file and controls the anti-virus circuit so as to detect a virus of the data file and to cure a virus of the data file.

In this embodiment, the controller is configured to drive the file system based upon identification information of the data file provided from a host device.

In this embodiment, the controller is configured to generate metadata including a name, an extension, a size, and location information of the data file based upon the identification information of the data file and to manage the generated metadata via the file system.

In this embodiment, the anti-virus circuit includes a matching circuit configured to detect whether the data file is infected by a virus, by comparing the data file and virus signature data; and a curing circuit configured to delete a virus of the data file and to recover the data file.

In this embodiment, the anti-virus circuit further includes a filter circuit configured to detect a virus infection probability of the data file.

In this embodiment, the storage medium includes a first storage medium group formed of a plurality of nonvolatile memory devices; and a second storage medium group formed of a plurality of nonvolatile memory devices.

In this embodiment, the first and second storage medium groups are connected to the controller via channels, respectively.

In this embodiment, the data storage device further includes a first buffer memory device configured to buffer a data file transferred via a channel of the first storage medium group; and a second buffer memory device configured to buffer a data file transferred via a channel of the second storage medium group, and wherein the anti-virus circuit includes a first anti-virus circuit configured to detect a virus of a data file buffered by the first buffer memory device and to cure a virus of the data file; and a second anti-virus circuit configured to detect a virus of a data file buffered by the second buffer memory device and to cure a virus of the data file.

Another aspect of embodiments of the inventive subject matter is directed to provide an operating method of a data storage device which includes a storage medium; and a controller controlling the storage medium and configured to detect a virus of one of a data file to be stored in the storage medium and a data file stored in the storage medium and to cure the detected virus. The operating method includes receiving a virus scanning command and identification information of a data file from a host device; detecting a virus of the data file based upon the identification information of the input data file and a file system managed within the data storage device; and transferring the detection result to the host device.

In this embodiment, the identification information of the data file is a file name of the data file.

In this embodiment, the detecting includes detecting a virus infection probability of the data file; and detecting whether the data file is infected by a virus, by comparing the data file and virus signature data.

In this embodiment, the operating method further includes updating the virus signature data or setting a virus scanning operation.

In this embodiment, the operating method further includes deleting the virus of the data file; and recovering the data file.

In this embodiment, the operating method further includes recording a scanning result, indicating that the data file is infected, at metadata managed by the file system, and the transferring includes transferring the scanning result to the host device based upon the metadata.

In this embodiment, the operating method further includes if an access to the data file is requested from the host device, confirming whether the data file is infected by a virus, based upon the metadata; and transferring a data file infected by a virus, a data file replacing a data file infected by a virus, or an error message according to a setting value provided from the host device.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
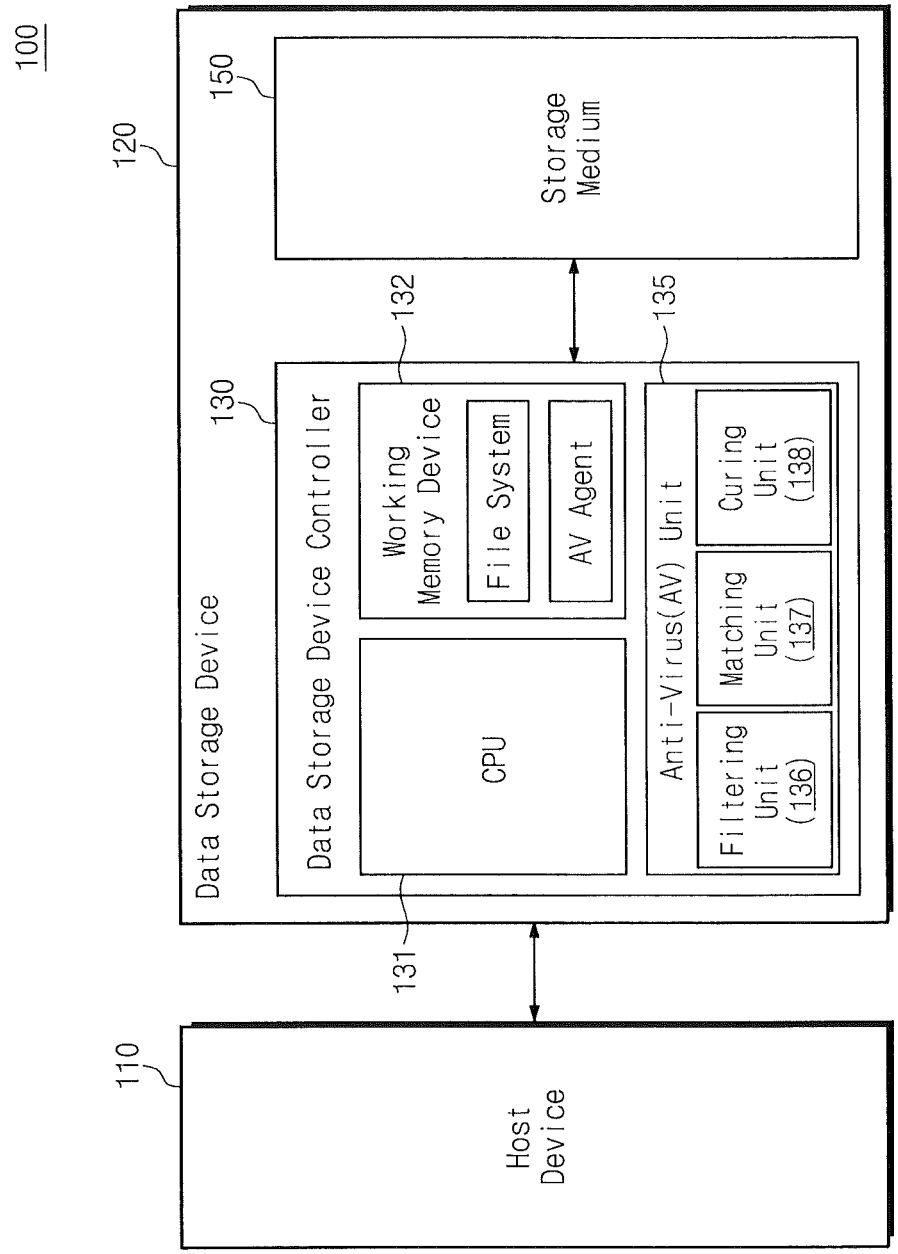
FIG. 1 is a block diagram illustrating a data processing system according to some embodiments of the inventive subject matter.

The inventive subject matter is described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive subject matter.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating a data processing system according to some embodiments of the inventive subject matter. A data processing system 120 may detect and cure (e.g., remove, disable or otherwise remedy) a virus on stored data using an anti-virus circuit 135. A data storage device 120 according to some embodiments may be configured to perform a virus scanning (e.g., search and cure) operation based upon a file system implemented by the data storage device 120. The data storage device 120 may be an object-based storage device (OSD), for example. The OSD may be an intelligent storage device that directly makes and manages metadata or a file system for managing a data file.

Referring to FIG. 1, the data storage device 120 may include a data storage device controller 130 and a storage medium 150. The data storage device controller 130 may include a CPU 131, a working memory device 132, and an anti-virus circuit (unit) 135.

The data storage device controller 130 may be configured to control overall operation of the data storage device 120. For example, the data storage device controller 130 may be configured to store data provided from a host device 110 in the storage medium 150. The data storage device controller 130 may also be configured to provide data stored in the storage medium 150 to the host device 110.

The storage medium 150 may be configured to permanently store data under the control of the data storage device controller 130. For example, the storage medium 150 may include a magnetic disk (e.g., a platter) or a nonvolatile memory device.

The data storage device controller 130 may drive a file system and an anti-virus agent to perform the virus scanning operation. The file system and the anti-virus agent may be software that is driven by an embedded operating system for driving the data storage device controller 130. The file system and the anti-virus agent may be loaded and driven on the working memory device 132.

The anti-virus circuit 135 may include a matching circuit 137 and a curing circuit 138. The anti-virus circuit 135 may further include a filter circuit 136. The filter circuit 136, the matching circuit 137, and the curing circuit 138 may operate under the control of an anti-virus agent loaded on the working memory device 132.

The filter circuit 136 may be configured to filter a virus infection probability of data. For example, the filter circuit 136 may be implement a bloom filter extracted from virus signature data using a hash function. The filter circuit 136 may determine a virus infection probability of data using the bloom filter.

The matching circuit 137 may detect virus infection by comparing data and the virus signature data. The virus signature data used at the matching and filter circuits 137 and 136 may include specific data patterns extracted from various viruses. The virus signature data may be provided from the anti-virus agent. The curing circuit 138 may be configured to delete a virus included in data and to recover data that has been infected.

The filter circuit 136, the matching circuit 137, and the curing circuit 138 may be implemented by a digital circuit, an analog circuit, or a combination of digital and analog circuits. In some embodiments, the filter circuit 136, the matching circuit 137, and the curing circuit 138 may be implemented by software driven by an anti-virus agent circuit loaded on the working memory device 132. In further embodiments, the filter circuit 136, the matching circuit 137, and the curing circuit 138 may be implemented by a combination of hardware and software.

According to some embodiments of the inventive subject matter, the data storage device 120 may directly make and manage metadata or a file system for managing a data file. Under the control of the host device 110, the data storage device 120 may perform a virus scanning operation based upon the file system. Accordingly, it is possible to reduce a data input/output operation between the host device 110 and the data storage device 120 executed at the virus scanning operation. Further, since the virus scanning operation is performed directly within the data storage device 120, it is possible to make real-time virus detection on a data file stored in the data storage device 120.

Figure 2:
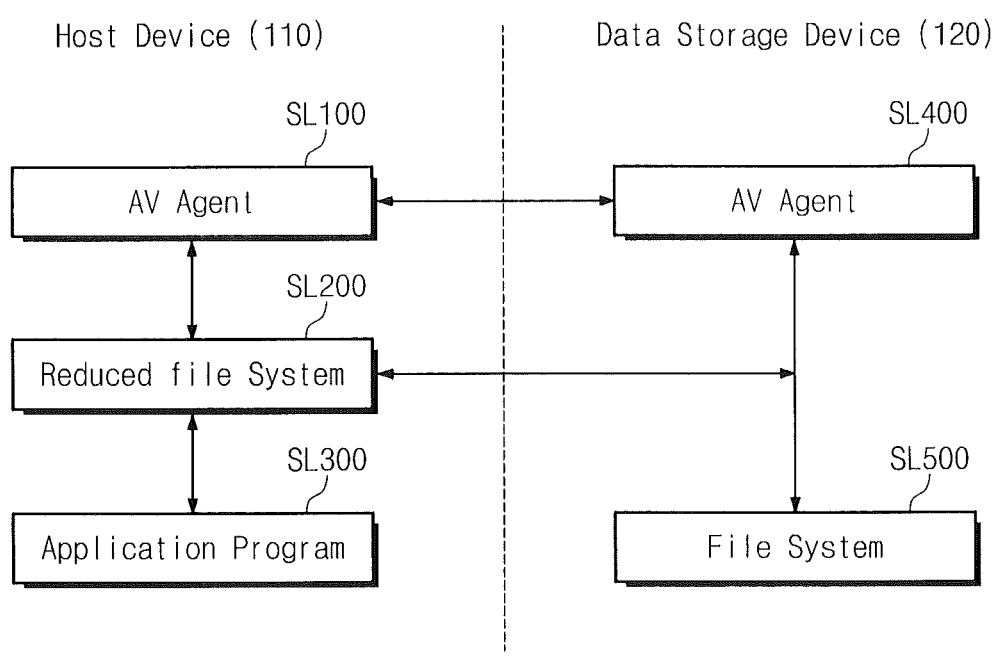
FIG. 2 is a diagram illustrating a software layer of a data processing system according to some embodiments of the inventive subject matter.

FIG. 2 is a diagram illustrating a software layer structure of a data processing system according to some embodiments of the inventive subject matter. The software layers of the host device 110 and the software layers of the data storage device 120 may be linked with each other to perform any operation (e.g., an operation of generating, deleting, or accessing a data file).

The software layers of the host device 110 may include an application program SL300 driven via an operating system and a reduced file system SL200. The software layers of the host device 110 may further include a host anti-virus agent SL100 for executing a virus scanning operation. The host anti-virus agent SL100 may be one of various application programs SL300 driven by the host device 110.

The software layers of the data storage device 120 may include an anti-virus agent SL400 driven via an embedded operating system for driving the data storage device 129 and a file system SL500.

As described above, a data storage device according to some embodiments of the inventive subject matter may be an object-based storage device (OSD). The OSD may directly make and manage a file system for managing a data file or metadata. Accordingly, the file system SL500 of the data storage device 120 may generate and manage an attribute of a data file updated at generating, deleting, and accessing of a data file. The data file attribute may include a file name, an extension, a file size, time information, a file location, and the like. The reduced file system SL200 of the host device 110 may manage data file identification information only. For example, the file identification information may include a file name of a data file.

The reduced file system SL200 and the file system SL500 may share the data file identification information. For example, the reduced file system SL200 and the file system SL500 may communicate with each other to update the data file identification information. Further, the reduced file system SL200 and the file system SL500 may communicate with each other to send the data file identification information.

The host device 110 and the data storage device 120 may perform an operation (e.g., file generating, deleting, or accessing) using the data file identification information. In particular, it is assumed that the application program SL300 of the host device 110 accesses any data file. The application program SL300 may request a corresponding data file from the reduced file system SL200 so as to access the corresponding data file. The reduced file system SL200 may request the corresponding data file from the file system SL500 based upon data file identification information. The file system SL500 may provide the reduced file system SL200 with corresponding data based upon a data file attribute (e.g., a file name, a file size, a file location, etc.).

The anti-virus agent SL100 of the host device 110 and the anti-virus agent SL400 of the data storage device 120 may be lined with each other for a virus scanning operation. The anti-virus agent SL100 of the host device 110 may be driven according to the control of a user. The anti-virus agent SL100 of the host device 110 may control the anti-virus agent SL400 of the data storage device 120. The anti-virus agent SL400 of the data storage device 120 may control an anti-virus circuit 135 in FIG. 1 to perform a virus scanning operation.

Virus scanning operations of the anti-virus agent SL100 of the host device 110 and the anti-virus agent SL400 of the data storage device 120 will be more fully described below. The anti-virus agent SL100 of the host device 110 may request a virus scanning operation on any data file from the anti-virus agent SL400 of the data storage device 120 based upon the reduced file system SL200. The anti-virus agent SL400 of the data storage device 120 may perform a virus scanning operation on a corresponding data file based on the file system SL500. The anti-virus agent SL400 of the data storage device 120 may report the result to the anti-virus agent SL100 of the host device 110.

The anti-virus agent SL100 of the host device 110 may update the anti-virus agent SL400 of the data storage device 120 or may change setting of the anti-virus agent SL400 of the data storage device 120. For example, in the event that updating of virus signature data is needed, the anti-virus agent SL100 of the host device 110 may update the anti-virus agent SL400 of the data storage device 120. Alternatively, the anti-virus agent SL100 of the host device 110 may change setting of the anti-virus agent SL400 of the data storage device 120 to set whether or not to use the anti-virus circuit 135 or to confirm a state of the anti-virus agent SL400 or the anti-virus circuit 135.

The virus scanning operation and the update operation of the data storage device 120 under the control of the anti-virus agent SL400 of the data storage device 120 will be more fully described with reference to FIGS. 3 to 6.

Figure 3:
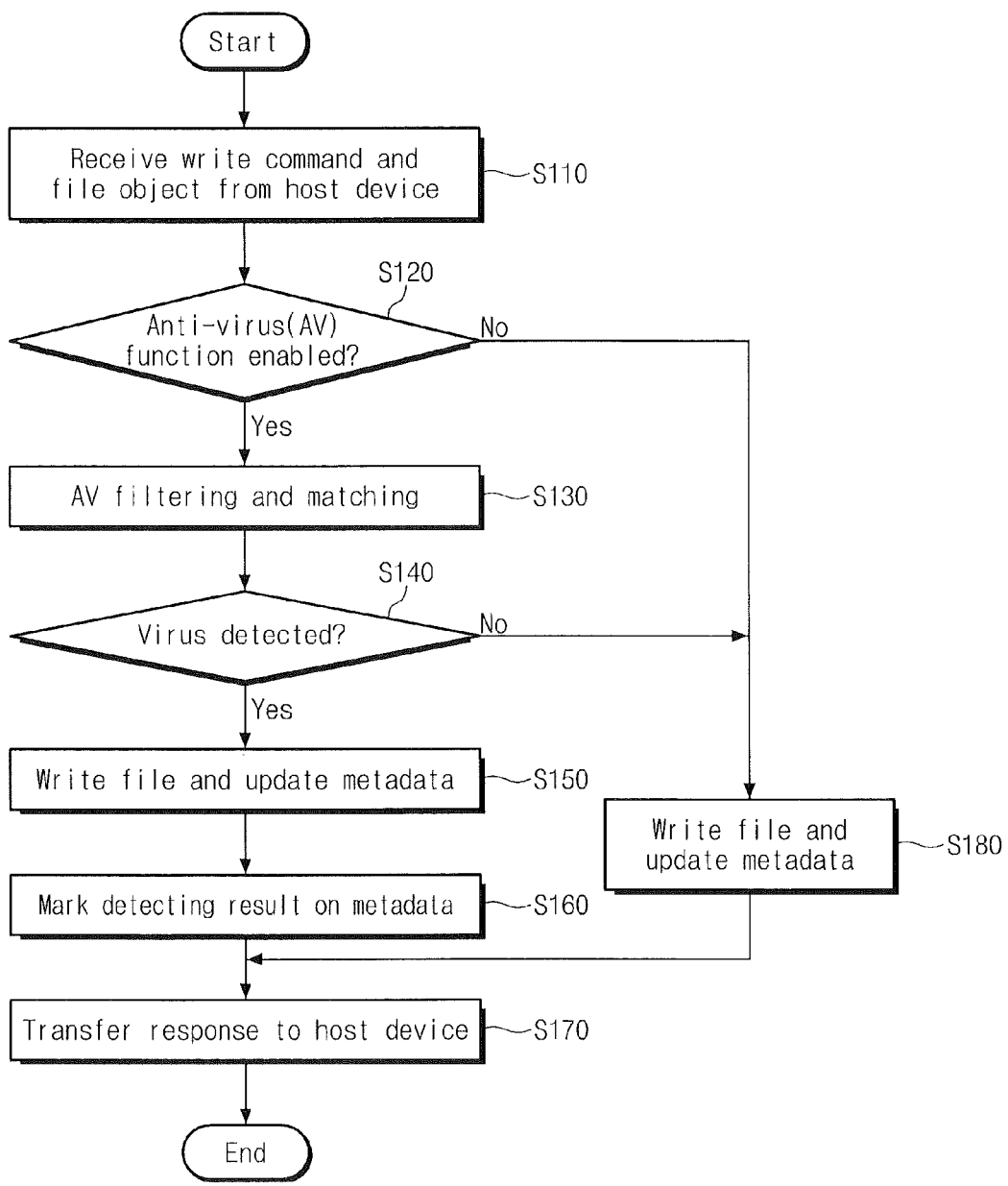
FIG. 3 is a flowchart for describing a data storing operation of a data storage device according to some embodiments of the inventive subject matter.

FIG. 3 is a flowchart illustrating data storing operations of a data storage device according to some embodiments of the inventive subject matter. Below, a data storing operation of a data storage device according to some embodiments of the inventive subject matter will be more fully described with reference to FIGS. 1 to 3.

In a step S110, a data storage device controller 130 may receive a write command and a file object from a host device 110. Herein, the file object may indicate actual data to be stored in a storage medium 150. As described above, a data storage device 120 may be an object-based storage device. Accordingly, the host device 110 (e.g., the reduced file system SL200) may generate data file identification information on a data file to be written and may transfer a write command and a file object (i.e., actual data to be stored) to the data storage device controller 130.

In a step S120, the data storage device controller 130, (e.g., the anti-virus agent SL400), may check whether an anti-virus function is enabled, in response to an input of the write command. The anti-virus function may be activated by the anti-virus agent SL100 of the host device 110.

If the anti-virus function is disabled, data storage operations may occur as follows. If the anti-virus function is disabled, in a step S180 the data storage device controller 130 may store the file object in the storage medium 150 and may update metadata corresponding to a data file. In the event that a new data file is written, metadata corresponding to the new data file may be generated. In a step S170, the data storage device controller 130 may provide the host device 110 with a response indicating that a write operation is completed.

If the anti-virus function is enabled, in step S130, the data storage device controller 130 (e.g., the anti-virus agent SL400) may cause the anti-virus circuit 135 to perform virus filtering and matching operations on the transferred file object. If a virus is not detected from the transferred file object, in a step S180 the data storage device controller 130 may store the file object in the storage medium 150 and may update metadata corresponding to a data file. In step S170, the data storage device controller 130 may provide the host device 110 with a response indicating that a write operation is completed.

In the event that a virus is detected from the transferred file object, in a step S150 the data storage device controller 130 may store the file object in the storage medium 150 and may update metadata corresponding to a data file. In a case where a new data file is written, metadata corresponding to the new data file may be generated. In a step S160, the data storage device controller 130 may include a virus detecting result in metadata corresponding to a data file from which a virus is detected. The virus detecting result may be information indicating whether a data file is infected by a virus and may include at least one bit of data.

After recording the virus detecting result, in a step S170 the data storage device controller 130 may provide the host device 110 with a response indicating that a write operation is completed. In a case where a virus is detected from the transferred file object, a response informing that a write operation is completed may include information indicating that a data file is infected by a virus.

Figure 4:
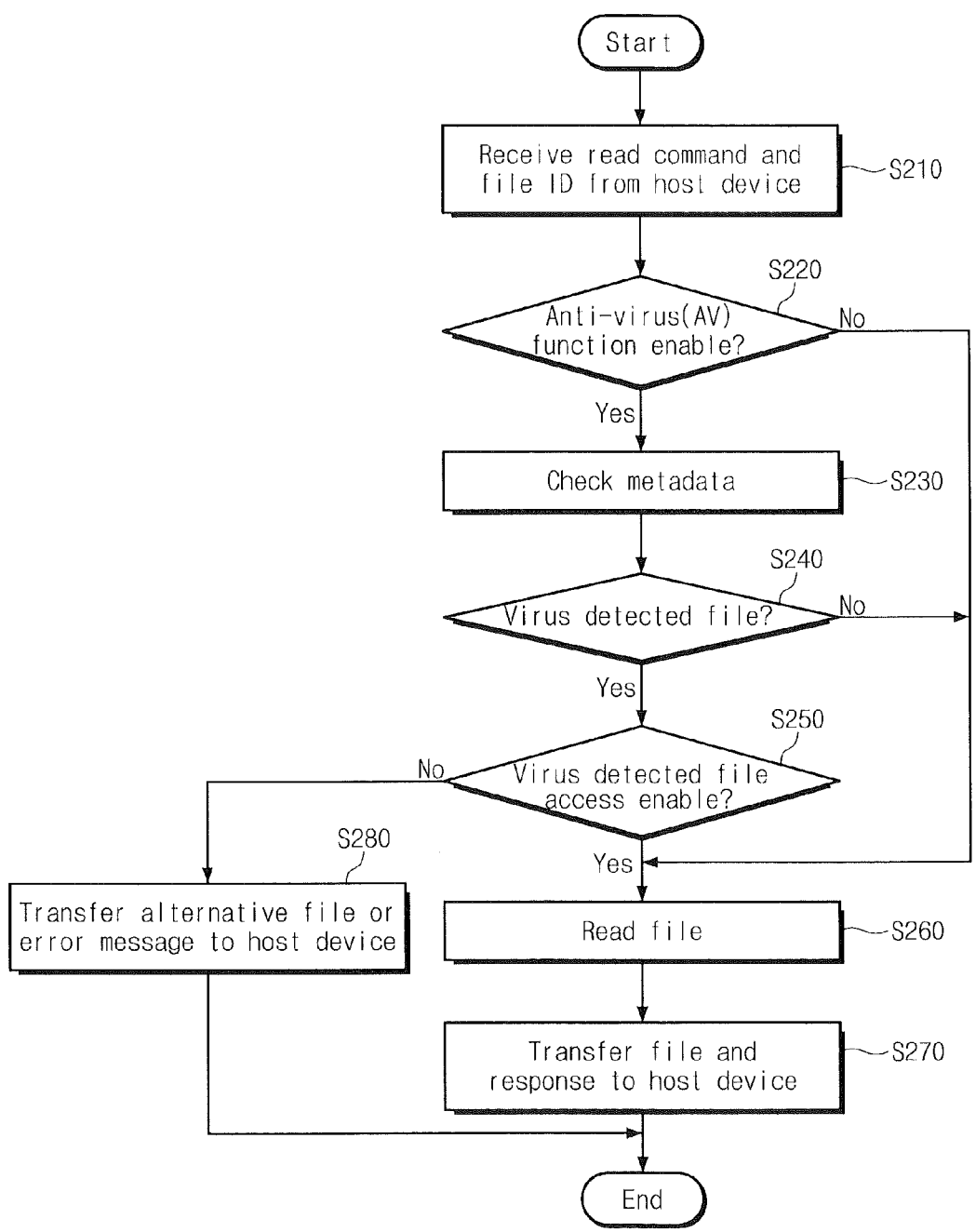
FIG. 4 is a flowchart for describing a data reading operation of a data storage device according to some embodiments of the inventive subject matter.

FIG. 4 is a flowchart for describing a data reading operation of a data storage device according to some embodiments of the inventive subject matter. Below, a data reading operation of a data storage device according to some embodiments of the inventive subject matter will be more fully described with reference to FIGS. 1, 2, and 4.

In a step S210, a data storage device controller 130 may receive a read command and data file identification information from a host device 110. The file identification information may be provided from the reduced file system SL200. In a step S220, the data storage device controller 130 (e.g., the anti-virus agent SL400) may check whether an anti-virus function is enabled, in response to an input of the read command. The agent SL100 of the host device 110 may activate the anti-virus function.

When the anti-virus function is not activated, a data reading operation may be made as follows. In a step S260, the data storage device controller 130 may read a data file based upon the file system SL500. In a step S270, the data storage device controller 130 may provide the host device 110 with the data file and a response indicating that a read operation is completed.

If the anti-virus function is activated, in a step S230 the data storage device controller 130 (e.g., the anti-virus agent SL400) may check metadata of a data file via the file system SL500. In a step S240, an operation may diverge according to whether a virus detecting result is recorded at metadata of a data file. If the virus detecting result is not recorded, in a step S260 the data storage device controller 130 may read a data file based upon the file system SL500. In the step S270, the data storage device controller 130 may provide the host device 110 with the data file and a response indicating that a read operation is completed.

If the virus detecting result is recorded, at a step S250 the data storage device controller 130 (e.g., the anti-virus agent SL400) may judge whether an access to a virus-detected data file is allowed. Whether access to a virus-detected data file is allowed may be set by an anti-virus agent SL100 of the host device 110.

If access to the virus-detected data file is allowed, in a step S260 the data storage device controller 130 may read a data file based upon the file system SL500. In the step S270, the data storage device controller 130 may provide the host device with a data file and a response indicating that a read operation is completed.

If access to the virus-detected data file is not to be allowed, in step S280 the data storage device controller 130 may send a replaced file or may provide the host device 110 with an error message. It is thereby possible to previously prevent the data processing system 100 from being infected by a virus.

Figure 5:
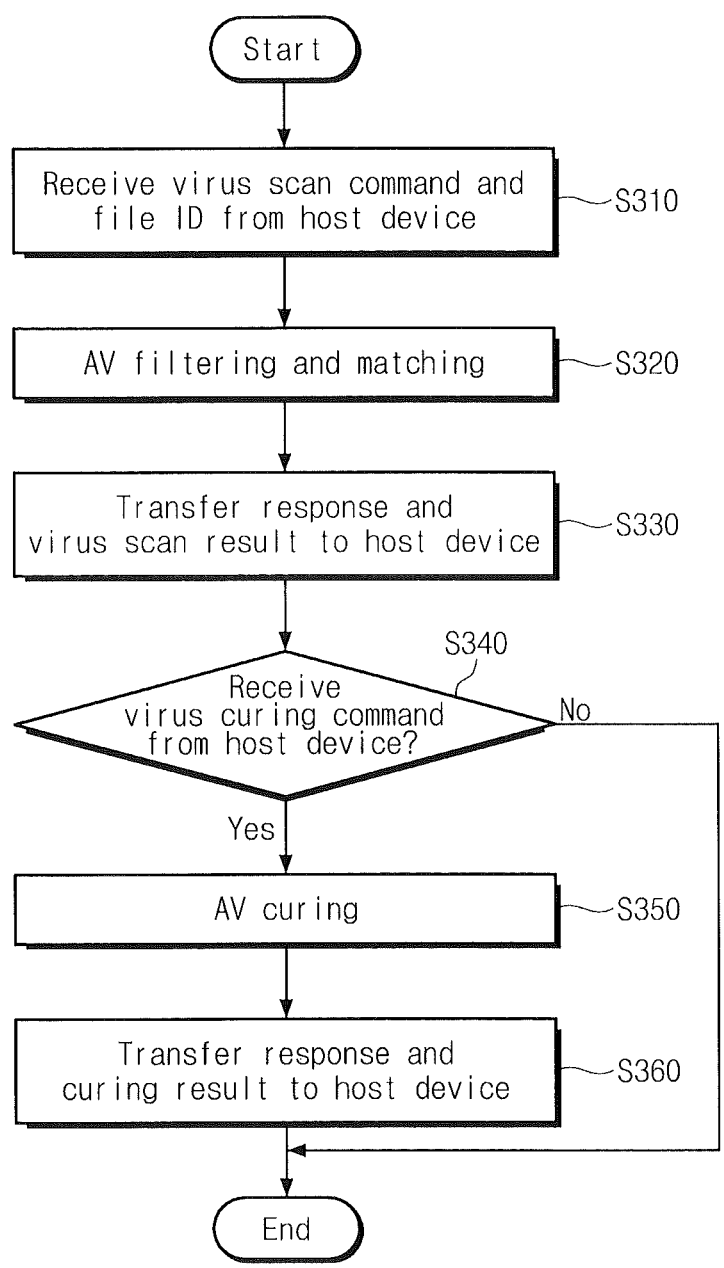
FIG. 5 is a flowchart for describing a virus scanning operation of a data storage device according to some embodiments of the inventive subject matter.

FIG. 5 is a flowchart for describing a virus scanning operation of a data storage device according to some embodiments of the inventive subject matter. Below, a virus scanning operation of a data storage device according to some embodiments of the inventive subject matter will be more fully described with reference to FIGS. 1, 2, and 5.

In a step S310, the data storage device controller 130 (e.g., the anti-virus agent SL400) may receive a virus scanning command and data file identification information form a host device 110. In a step S320, the data storage device controller 130 may perform a virus filtering operation and a virus matching operation based upon the data file identification information and the file system SL500. The data storage device controller 130 may control the anti-virus circuit 135 to perform the virus filtering and matching operations. In a step S330, the data storage device controller 130 may provide a response to the virus scanning command and a virus scanning result.

In a step S340, the data storage device controller 130 may judge whether a virus curing command is received from the host device 110. If the virus curing command is received, in a step S350 the data storage device controller 130 may perform a virus curing operation on an infected data file. In a step S360, the data storage device controller 130 may provide the host device 110 with a response to the virus curing command and a curing result. In the event that the virus curing command is not received from the host device 110, the data storage device controller 130 may end the virus scanning operation.

Figure 6:
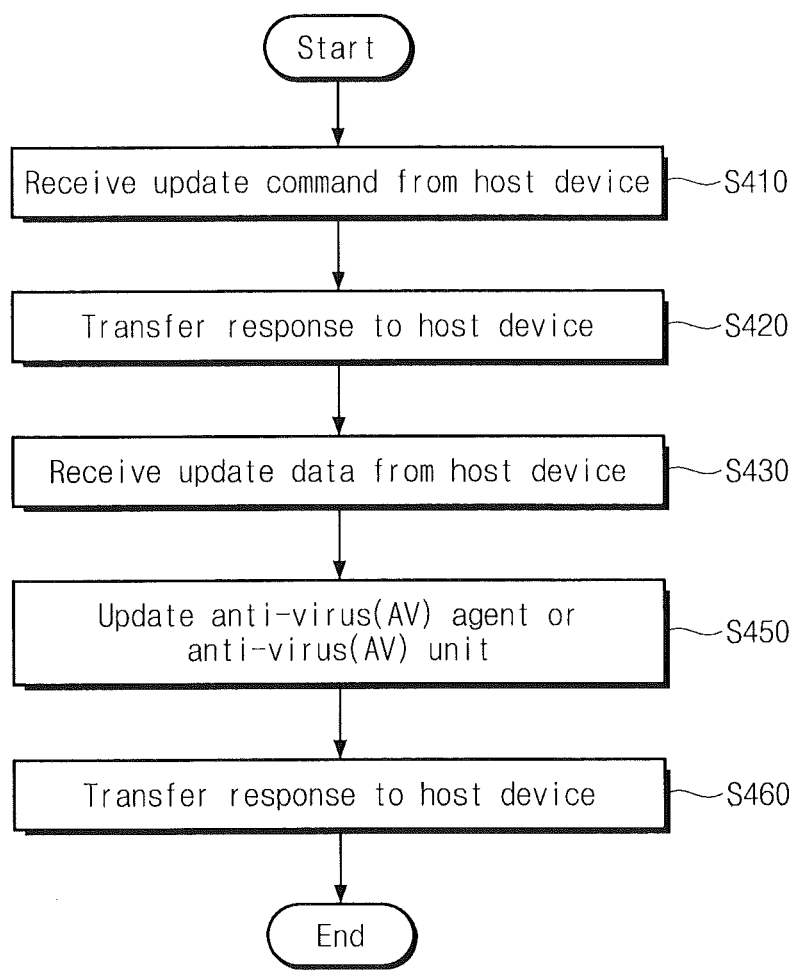
FIG. 6 is a flowchart for describing an update operation of an anti-virus circuit of a data storage device according to some embodiments of the inventive subject matter.

FIG. 6 is a flowchart for describing an update operation of an anti-virus circuit of a data storage device according to some embodiments of the inventive subject matter. Below, an update operation of an anti-virus circuit of a data storage device according to some embodiments of the inventive subject matter will be more fully described with reference to FIGS. 1, 2, and 6.

In a step S410, a data storage device controller 130 (e.g., the anti-virus agent SL400) may receive an update command from a host device 110, that is, an anti-virus agent SL100. The data storage device controller 130 may send a response to the update command to the host device 110. For example, the response may include information indicating that the update command is received normally. In another embodiment, the response may include information on a current version of the anti-virus agent SL400. In still another embodiment, the response may include update certification information.

In a step S430, the data storage device controller 130 may receive update data from the host device 110. For example, the update data may include virus signature data. In another embodiment, the update data may include information for changing a setting of the anti-virus agent SL400.

In a step S450, the data storage device controller 130 may update the anti-virus agent SL400 or the anti-virus circuit 135 based upon the input update data. In a step S460, the data storage device controller 130 may provide the host device 110 with a response indicating that an update operation is completed.

Figure 7:
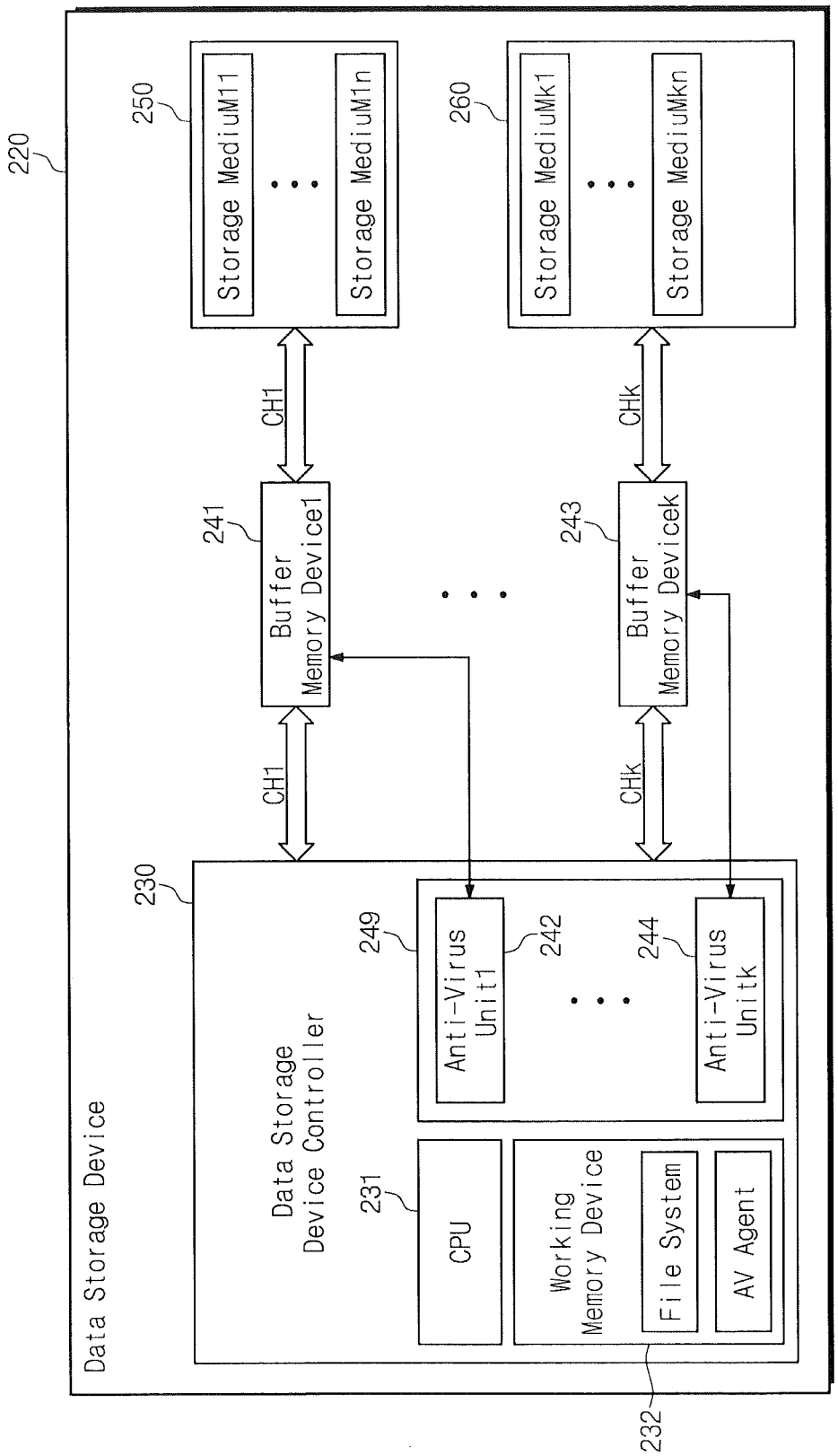
FIG. 7 is a block diagram illustrating a data processing system according to another exemplary embodiment of the inventive subject matter.

FIG. 7 is a block diagram illustrating a data processing system according to another exemplary embodiment of the inventive subject matter. A data storage device 220 may perform a virus scanning operation on stored data using an anti-virus circuit 249. The data storage device 220 may include a file system to perform the virus scanning operation. The data storage device 220 may directly perform the virus scanning operation based upon a file system. The data storage device 220 may be an object-based storage device OSD, for example.

Referring to FIG. 7, the data storage device 220 may include a data storage device controller 230 and storage media 250 and 260. The data storage device controller 230 may include a CPU 231, a working memory device 232, and an anti-virus circuit 249. Each of the storage media 250 and 260 may include a plurality of storage media. For example, the storage media 250 and 260 may be formed of a plurality of nonvolatile memory devices. The storage media 250 and 260 may be connected to the data storage device controller 230 via channels CH1 to CHk, respectively.

The data storage device controller 230 may be configured to control an overall operation of the data storage device 220. For example, the data storage device controller 230 may be configured to store data provided from a host device (not shown) in the storage media 250 and 260. The data storage device controller 230 may be configured to transfer data stored in the storage media 250 and 260 to the host device. To improve a processing speed, the data storage device controller 230 may store data in the storage media 250 and 260 using an interleaving manner or may read data from the storage media 250 and 260 using an interleaving manner.

According to some embodiments of the inventive subject matter, the data storage device controller 230 may drive a file system and an anti-virus agent to perform a virus scanning operation. The file system and the anti-virus agent may be software driven via an embedded operating system for driving the data storage device controller 230. The file system and the anti-virus agent may be loaded and driven on the working memory device 232.

A buffer memory device 241 may be connected between the storage medium 250 and the data storage device controller 230. The buffer memory device 241 may be connected to the anti-virus circuit 242. The buffer memory device 241 may buffer data transferred between the storage medium 250 and the data storage device controller 230. The anti-virus circuit 242 may perform a virus scanning operation on data temporarily stored in the buffer memory device 241 according to the control of the data storage device controller 230.

A buffer memory device 243 may be connected between the storage medium 260 and the data storage device controller 230. The buffer memory device 243 may be connected to the anti-virus circuit 244. The buffer memory device 243 may buffer data transferred between the storage medium 260 and the data storage device controller 230. The anti-virus circuit 244 may perform a virus scanning operation on data temporarily stored in the buffer memory device 243 according to the control of the data storage device controller 230 (i.e., an anti-virus agent). The anti-virus agent and the anti-virus circuit 249 may be configured the same as those described in FIGS. 1 to 6, and description thereof is thus omitted.

The data storage device 220 may directly generate and manage metadata or a file system for managing a data file. Under the control of a host device (not shown), the data storage device 220 may perform a virus scanning operation based upon the file system. Accordingly, it is possible to reduce a data input/output operation between the host device and the data storage device 220 executed at the virus scanning operation. Further, since the virus scanning operation is performed directly within the data storage device 220, it may be possible to conduct substantially real-time virus detection on a data file stored in the data storage device 220. It may be possible to reduce a time taken to perform a virus scanning operation by making parallel processing on a virus scanning operation via the anti-virus circuits 242 and 244 each provided to channels CH1 and CHk.

Figure 8:
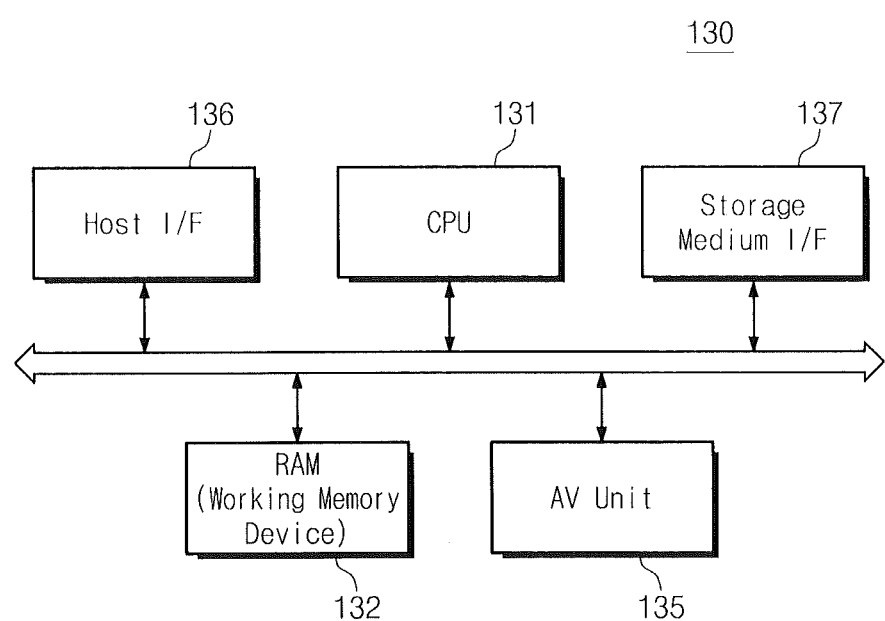
FIG. 8 is a block diagram illustrating a data storage device controller according to some embodiments of the inventive subject matter.

FIG. 8 is a block diagram illustrating a data storage device controller according to some embodiments of the inventive subject matter. Referring to FIG. 8, there is shown an example of a data storage device controller 130 included in a data storage device 120 in FIG. 1 according to some embodiments of the inventive subject matter. However, it is understood that components of the data storage device controller 130 other than an anti-virus circuit 135 are included in a data storage device controller 230 included in a data storage device 220 in FIG. 7 according to another exemplary embodiment of the inventive subject matter. Below, the data storage device controller 130 will be more fully described with reference to FIGS. 1 and 8.

The data storage device controller 130 may include a CPU 131, a RAM 132, an anti-virus circuit 135, a host interface 136, and a data storage medium interface 137.

The CPU 131 may be configured to control an overall operation of the data storage device controller 130. The RAM 132 may be used as a working memory of the CPU 131. The anti-virus circuit 135 may be configured to perform a virus scanning operation in the same manner as described in FIGS. 1 and 2.

The host interface 136 may include a protocol for data exchange between a host device 110 and a data storage device controller 130. For example, the host interface 136 may be configured to communicate with the host device 110 via one of various protocols such as a USB (Universal Serial Bus) protocol, an MMC (Multimedia Card) protocol, a PCI (Peripheral Component Interconnection) protocol, a PCI-E (PCI-Express) protocol, an ATA (Advanced Technology Attachment) protocol, a SATA (Serial ATA) protocol, a SCSI (Small Computer Small Interface) protocol, an ESDI (Enhanced Small Disk Interface) protocol, and an IDE (Integrated Drive Electronics) protocol.

The data storage medium interface 137 may provide an interface between the storage medium 150 and the data storage device controller 130.

The data storage device controller 130 is not limited to the above-described components. For example, the data storage device controller 130 may further include a ROM for storing code data needed for an initial booting operation. Alternatively, the data storage device controller 130 may further include a component such as an ECC circuit.

In a case where the storage medium 150 is formed of a memory device, the data storage device controller 130 and the storage medium 150 may be integrated in a single semiconductor device. The data storage device controller 130 and the storage medium 150 may be integrated in a single semiconductor device to form a memory card. For example, the data storage device controller 130 and the storage medium 150 may be integrated in a single semiconductor device to form a memory card such as a PC (PCMCIA) card, a CF card, an SM (or, SMC) card, a memory stick, a multimedia card (MMC, RS-MMC, MMCmicro), a security card (SD, miniSD, microSD, SDHC), a universal flash storage (UFS) device, or the like. In another embodiment, the data storage device controller 130 and the storage medium 150 may form a solid state drive (SSD).

In some embodiments, the data storage device controller 130 or the storage medium 150 may be packed by various types of packages such as Pop (Package on Package), Ball grid arrays (BGAs), Chip scale packages (CSPs), Plastic Leaded Chip Carrier (PLCC), Plastic Dual In-Line Package (PDI2P), Die in Waffle Pack, Die in Wafer Form, Chip On Board (COB), Ceramic Dual In-Line Package (CERDIP), Plastic Metric Quad Flat Pack (MQFP), Small Outline (SOIC), Shrink Small Outline Package (SSOP), Thin Small Outline (TSOP), Thin Quad Flat pack (TQFP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A data storage device comprising:
a storage medium; and
a controller circuit configured to be coupled to an external host to provide an interface between the external host and the storage medium, the controller circuit configured to detect a virus in a data file responsive to receiving the data file from the external host, to store the data file and metadata for the data file including a virus detection result for the data file in the storage medium, and, responsive to a read command, to detect presence of the virus in the data file from the virus detection result in the stored metadata.

2. The data storage device of claim 1, wherein the controller circuit is further configured to cure the detected virus.

3. The data storage device of claim 1, wherein the controller circuit is configured to detect a virus in a data file received from the external host in conjunction with a write command from the external host.

4. The data storage device of claim 3, wherein the controller circuit is further configured to indicate presence of the detected virus to the external host.

5. The data storage device of claim 1, wherein the controller circuit is further configured to selectively transfer the data file, an alternative file and/or an error message to the external host responsive to detecting presence of the virus.

6. The data storage device of claim 1, wherein the controller circuit is configured to receive a virus scan command from the external host, to conduct a virus scan of a data file stored in the storage medium responsive to the virus scan command and to provide a virus scan result to the external host responsive to the virus scan.

7. The data storage device of claim 6, wherein the controller circuit is further configured to receive a virus cure command from the external host, to conduct a virus curing operation responsive to the received virus cure command and to provide a virus cure result to the external host responsive to the virus curing operation.

8. The data storage device of claim 1, wherein the controller circuit comprises an anti-virus circuit comprising:
a matching circuit configured to detect a virus by comparing the data file and virus signature data; and
a curing circuit configured to delete the detected virus.

9. The data storage device of claim 8, wherein the anti-virus circuit further comprises a filter circuit configured to determine a virus infection probability of the data file.

10. The data storage device of claim 1, wherein the storage medium comprises first and second storage media connected to the controller via respective first and second channels.

11. The data storage device of claim 10:
wherein the data storage device further comprises:
a first buffer memory device configured to buffer a data file transferred via the first channel; and
a second buffer memory device configured to buffer a data file transferred via the second channel; and
wherein the anti-virus circuit comprises:
a first anti-virus circuit configured to detect and cure a virus of the data file buffered by the first buffer memory device; and
a second anti-virus circuit configured to detect and cure a virus of the data file buffered by the second buffer memory device.

12. The data storage device of claim 1 implemented as a semiconductor device, a memory card, or a solid state drive (SSD).

13. The data storage device of claim 1, wherein the controller circuit is configured to operate the storage device an object-based storage device (OSD).

14. A method of operating a data storage device configured to be coupled to an external host, the method comprising:
detecting a virus carried by a data file transferred to the storage device from the external host responsive to receiving the data file from the external host using a controller circuit integrated with the storage medium in the storage device;
storing the data file and metadata for the data file including a virus detection result for the data file; and
detecting, responsive to a read command received from the external host, presence of the virus in the stored data file from the virus detection result in the stored metadata.

15. The method of claim 14, further comprising curing the detected virus using the controller circuit.

16. The method of claim 14, wherein detecting a virus comprises detecting the virus in a file received from the external host in conjunction with a write command from the external host.

17. The method of claim 14, further comprising receiving a virus scan command from the external host, conducting a virus scan of a data file stored in the storage medium responsive to the virus scan command and providing a virus scan result to the external host responsive to the virus scan.

18. The method of claim 14, further comprising selectively transferring the data file, an alternative file and/or an error message to the external host responsive to detecting presence of the virus in the stored data file.

* * * * *